United States Patent
Shen et al.

(10) Patent No.: US 8,277,101 B2
(45) Date of Patent: Oct. 2, 2012

(54) LED HEADLIGHT COOLING SYSTEM AND LED HEADLIGHT THERMAL CONDUCTING DEVICE

(75) Inventors: Chih-Chiu Shen, Taichung (TW); Kai-Ming Yang, Taichung (TW); Kai-Jen Yang, Taichung (TW); Su-Hon Lin, Keelung (TW)

(73) Assignee: Kaiming Yang, Taichung (TW)

( * ) Notice: Subject to any disclaimer, the term of this patent is extended or adjusted under 35 U.S.C. 154(b) by 409 days.

(21) Appl. No.: 12/764,110

(22) Filed: Apr. 21, 2010

(65) Prior Publication Data

US 2011/0157910 A1    Jun. 30, 2011

(30) Foreign Application Priority Data

Dec. 24, 2009    (TW) .............................. 98144847 A

(51) Int. Cl.
*B60Q 1/00*    (2006.01)

(52) U.S. Cl. .......... 362/547; 362/294; 362/373
(58) Field of Classification Search .............. 362/547, 362/294, 373; 165/80.3
See application file for complete search history.

(56) References Cited

U.S. PATENT DOCUMENTS

| | | | |
|---|---|---|---|
| 7,699,501 B2 * | 4/2010 | Liu | 362/294 |
| 7,762,696 B2 * | 7/2010 | Wan et al. | 362/373 |
| 8,011,815 B2 * | 9/2011 | Zhou et al. | 362/373 |
| 2010/0157606 A1 * | 6/2010 | Roucoules et al. | 362/294 |
| 2010/0321950 A1 * | 12/2010 | Wong | 362/547 |

* cited by examiner

*Primary Examiner* — Ali Alavi
(74) *Attorney, Agent, or Firm* — CKC & Partners Co., Ltd.

(57) ABSTRACT

An LED headlight cooling system includes a vehicle air conditioner, a thermal conducting device and an LED headlight. The vehicle air conditioner has a cooling device. The thermal conducting device is thermally connected to the cooling device of the vehicle air conditioner. The LED headlight is thermally connected to the thermal conducting device.

19 Claims, 10 Drawing Sheets

LED HEADLIGHT COOLING SYSTEM AND LED HEADLIGHT THERMAL CONDUCTING DEVICE

RELATED APPLICATIONS

The application claims priority to Taiwan Application Serial Number 98144847, filed Dec. 24, 2009, which is herein incorporated by reference.

BACKGROUND

1. Technical Field

The present disclosure relates to cooling systems. More particularly, the present disclosure relates to LED cooling systems.

2. Description of Related Art

Recently, the Light emitting diode (LED) is used as an illuminator in many device, and is increasingly used for lighting. LED presents many advantages such as lower energy consumption, longer lifetime, smaller size and high efficiency.

But, over-driving the LED may result in overheating of the LED package, then leading to device failure. Therefore, adequate heat sinking is required to maintain the LED long life.

SUMMARY

According to one embodiment, an LED headlight cooling system includes a vehicle air conditioner, a thermal conducting device and an LED headlight. The vehicle air conditioner has a cooling device. The thermal conducting device is thermally connected to the cooling device of the vehicle air conditioner. The LED headlight is thermally connected to the thermal conducting device.

According to another embodiment, an LED headlight thermal conducting device connects an LED headlight of a vehicle and a cooling device of the vehicle. The LED headlight thermal conducting device includes a pipe body, a connecting member and a clip. The connecting member connects one end of the pipe body to the LED headlight of the vehicle. The clip connects the other end of the pipe body to the cooling device of the vehicle.

DETAILED DESCRIPTION

According to inventor's long-term observation and many years of practical experience, at present a variety of LED headlight cooling device, such as water-cooled device or air-cooled device of access isn't feasible. In general, the best operating temperature of the engine of the vehicle is around 80° C. But, the vehicle on the road due to exposure to sunlight, the temperature of the vehicle is about 40° C. or more. Therefore, the temperature of the headlight is restricted by the environmental conditions, so that the temperature of the headlight cannot be cooled under 30° C. by the general cooling device.

In the following detailed description for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
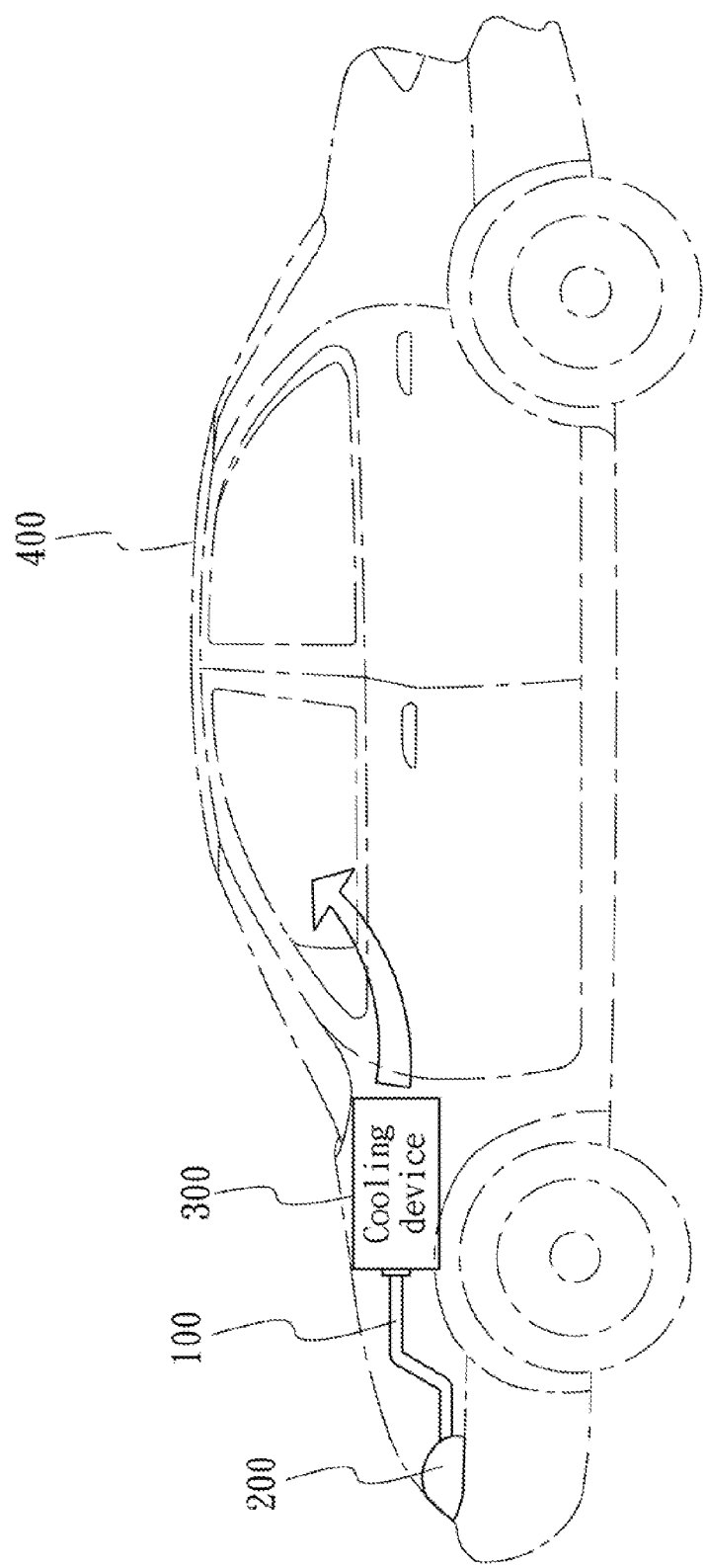
FIG. 1 is a schematic view of an LED headlight cooling system according to one embodiment.

FIG. 1 is a schematic view of an LED headlight cooling system according to one embodiment. The LED headlight cooling system includes a vehicle air conditioner, a thermal conducting device 100 and an LED headlight 200. The vehicle air conditioner has a cooling device 300. The cooling device 300 can make the air in a vehicle 400 cooler, and make the driver and the passenger in the car comfortable. The thermal conducting device 100 is thermally connected to the cooling device 300 of the vehicle air conditioner. The LED headlight 200 is thermally connected to the thermal conducting device 100. Therefore, the thermal from the LED headlight 200 is diffused by the vehicle air conditioner via the thermal conducting device 100.

Figure 2:
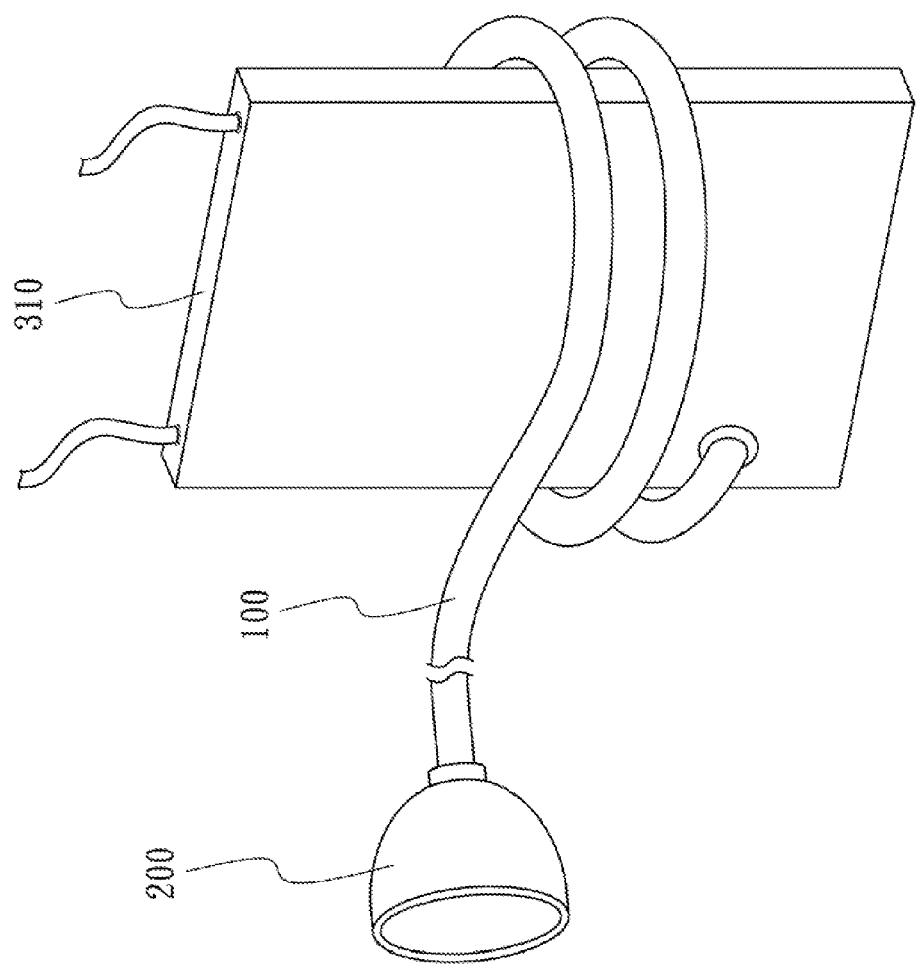
FIG. 2 is a schematic view of the cooling device of FIG. 1.

FIG. 2 is a schematic view of the cooling device 300 of FIG. 1. In FIG. 2, the cooling device 300 is a Peltier device 310. The thermal conducting device 100 is a heat pipe. The heat pipe can be directly connected to the Peltier device 310, such as be brazed or welded to the Peltier device 310. Additionally, the heat pipe can be indirectly connected to the Peltier device 310, like wind the heat pipe to the Peltier device 310. Therefore, the Peltier device 310 is just like a heat sink for cooling the LED headlight 200 via the thermal conducting device 100. Certainly, the thermal conducting device 100 also can be a thermal-conductive metal.

Figure 3:
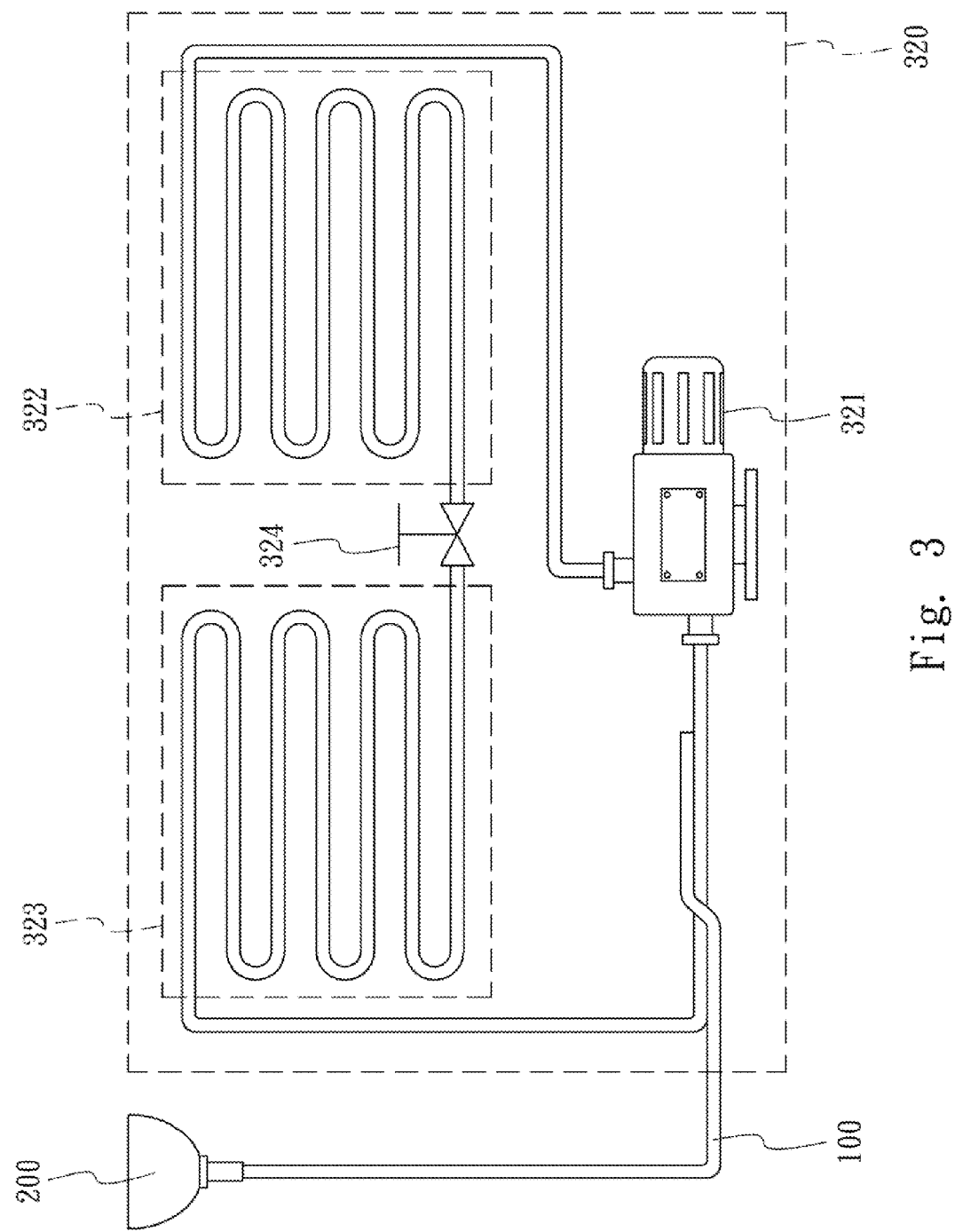
FIG. 3 is a schematic view of the cooling device according to another embodiment.

FIG. 3 is a schematic view of the cooling device 300 according to another embodiment. In FIG. 3, the cooling device 300 is a coolant system 320, and the thermal conducting device 100 is a heat pipe. The coolant system 320 has a coolant line, a compressor 321, a condenser 322, an evaporator 323 and an expansion valve 324. One end of the heat pipe can be directly or indirectly connected to the coolant line of the coolant system 320. In other words, the heat pipe and the coolant line of the coolant system 320 are unnecessarily connected together directly. The heat pipe and the coolant line of the coolant system 320 can just be contacted tightly and the thermal can be transferred. Comparatively speaking, when the heat pipe is directly connected to the coolant line of the coolant system 320, the coolant can be injected into the heat pipe. It not only increases the chance of coolant leak but also increases the cost when the layout of the coolant line needs to be redesigned. Therefore, the LED headlight cooling system further includes a clip. The clip clips the thermal conducting device 100 to the coolant line of the coolant system 320. According to the location of FIG. 3, the evaporator 323 is a heat sink for diffusing the heat There are several ways for connecting the thermal conducting device 100 and the coolant line, such as:

1. Welding: The thermal conducting device 100 and the coolant line are welded together.

2. Soldering: The thermal conducting device 100 and the coolant line are soldered together.

3. Screw thread: The thermal conducting device 100 and the coolant line are threaded via internal threads and external threads.

Figure 4:
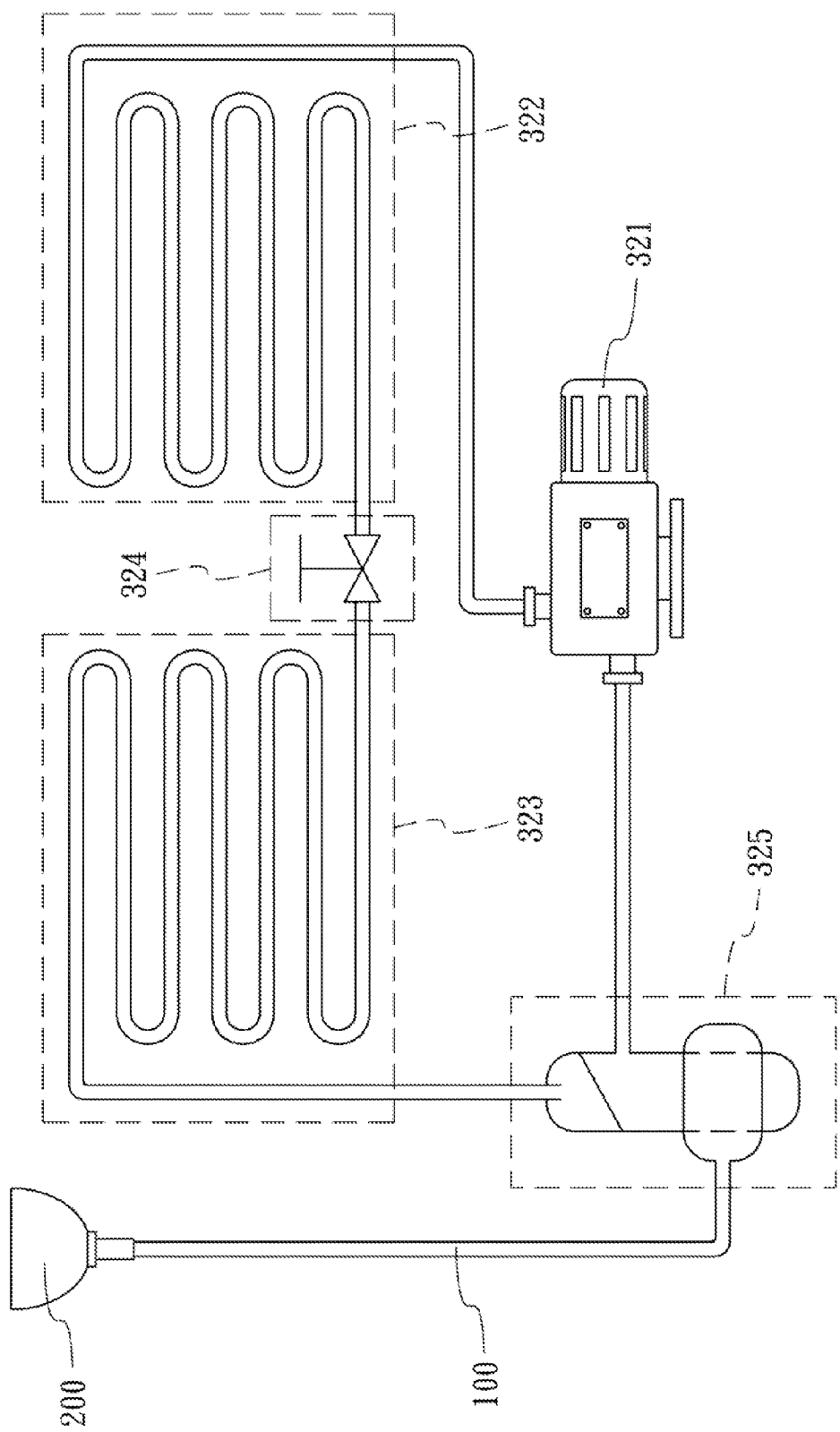
FIG. 4 is a schematic view of the coolant system and the thermal conducting device according to yet another embodiment.

FIG. 4 is a schematic view of the coolant system 320 and the thermal conducting device 100 according to yet another embodiment. In FIG. 4, the thermal conducting device 100 is connected to the junction of the coolant line and the evaporator 323. In detail, the thermal conducting device 100 has a vapor-liquid separator 325. The vapor-liquid separator 325 is connected to the coolant line, and the thermal conducting device 100 is connected to the junction of the coolant line and the vapor-liquid separator 325. Therefore, the temperature of the coolant system 320 can be decreased to a minimum for cooling the LED headlight when the coolant system 320 is used.

Figure 5:
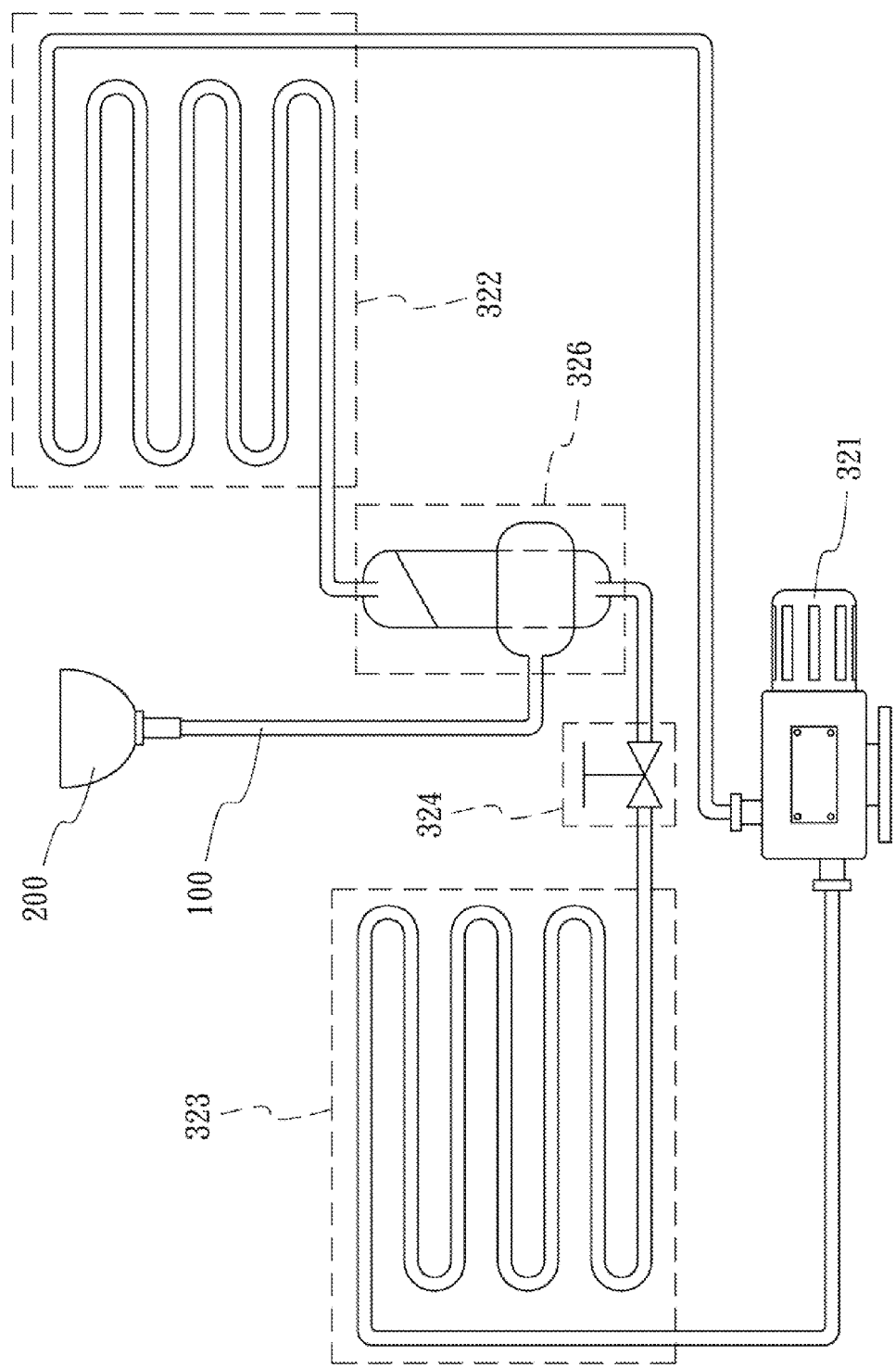
FIG. 5 is a schematic view of the coolant system and the thermal conducting device according to still another embodiment.

FIG. 5 is a schematic view of the coolant system 320 and the thermal conducting device 100 according to still another embodiment. In FIG. 5, the condenser 322 is connected to the coolant line, and the thermal conducting device 100 is connected to the junction of the coolant line and the condenser 322. In detail, the coolant system 320 has a reservoir 326: The reservoir 326 is connected to the coolant line, and the thermal conducting device 100 is connected to the junction of the coolant line and the reservoir 326. Therefore, the LED headlight can be cooled when the coolant system 320 is closed. In other words, the coolant can vaporize and condensate in the reservoir 326. When the thermal conducting device 100 is connected to the reservoir 326 of the coolant system 320, the coolant in the reservoir 326 can be used for dissipating heat.

The coolant can be vaporized by the heat from the LED headlight. If the coolant can't be vaporized completely, the engine of the vehicle also can vaporize the coolant. In general, the temperature of the coolant line can remain under 25° C. when the coolant system 320 is closed. At the same time, the LED headlight also can be cooled.

The surface of the coolant line is frosted over when the vehicle is turned off. The residue heat of the LED headlight 200 can be transmitted via the thermal conducting device 100 for melting the frost.

Figure 6:
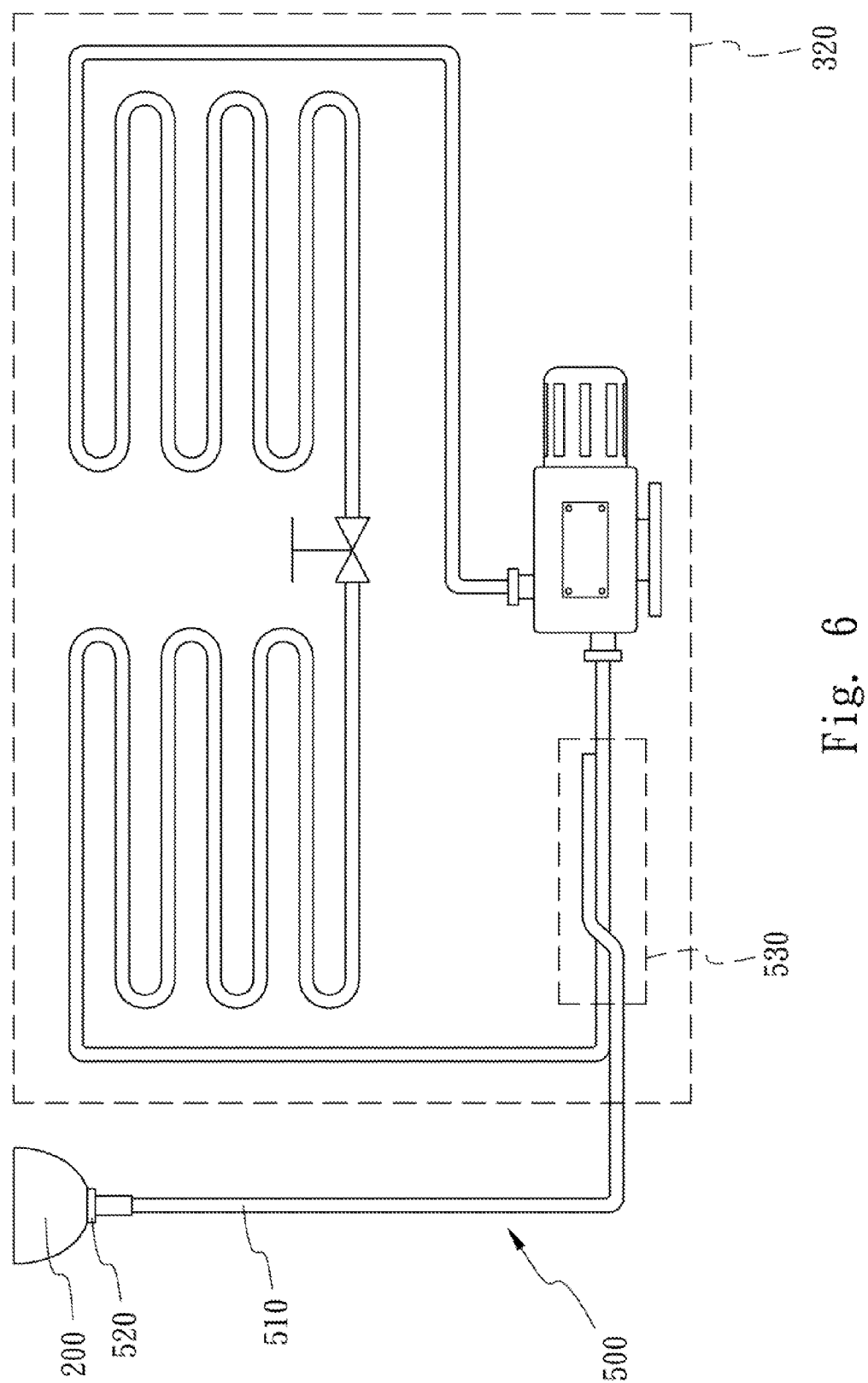
FIG. 6 is a schematic view of an LED headlight thermal conducting device according to yet another embodiment.

FIG. 6 is a schematic view of an LED headlight thermal conducting device 500 according to yet another embodiment. The LED headlight thermal conducting device 500 connects an LED headlight 200 of a vehicle and a cooling device of the vehicle. The LED headlight thermal conducting device 500 includes a pipe body 510, a connecting member 520 and a clip 530. The connecting member 520 connects one end of the pipe body 510 to the LED headlight 200 of the vehicle. The clip 530 connects the other end of the pipe body 510 to the cooling device of the vehicle. Therefore, the thermal from the LED headlight 200 is diffused by the cooling device of the vehicle via LED headlight thermal conducting device 500.

Figure 7:
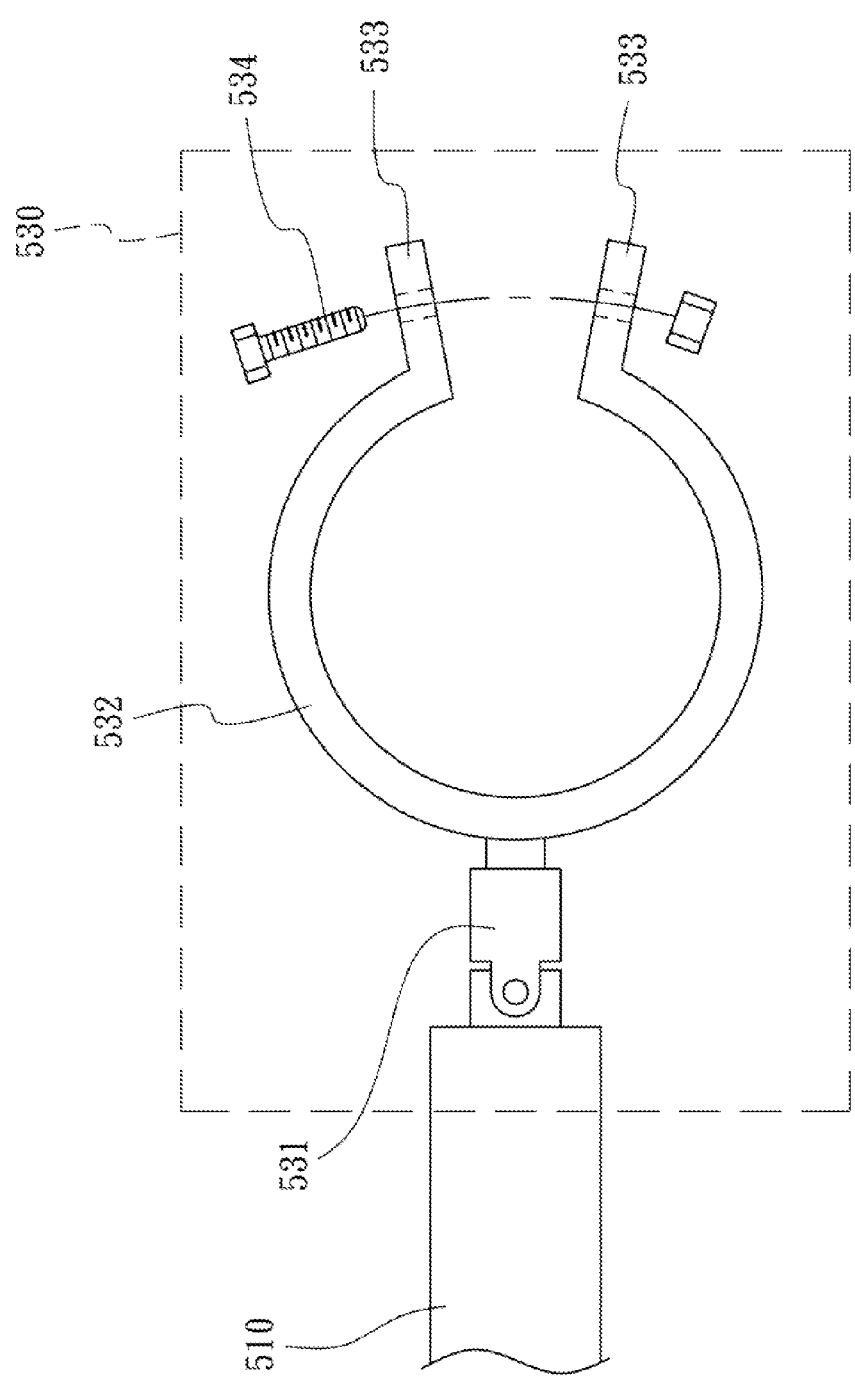
FIG. 7 is a schematic view of the clip of FIG. 6.

FIG. 7 is a schematic view of clip 530 of FIG. 6. The clip 530 is connected to the coolant line of the coolant system 320. In FIG. 7, the clip 530 is a mechanical clip, such as a circlip. The circlip includes a universal joint 531, a locking ring 532, two jaws 533 and a screw 534. The LED headlight thermal conducting device 500 can be connected to any type of vehicle and coolant system via the universal joint 531. The clip 530 can be tightly connected to the coolant line of the coolant system by the locking ring 532, two jaws 533 and a screw 534. For decreasing the thermal resistance, the junction of the locking ring 532 and the coolant line, and the junction of the universal joint 531 and the pipe body 510 can be smeared with some thermal grease.

Figure 8A:
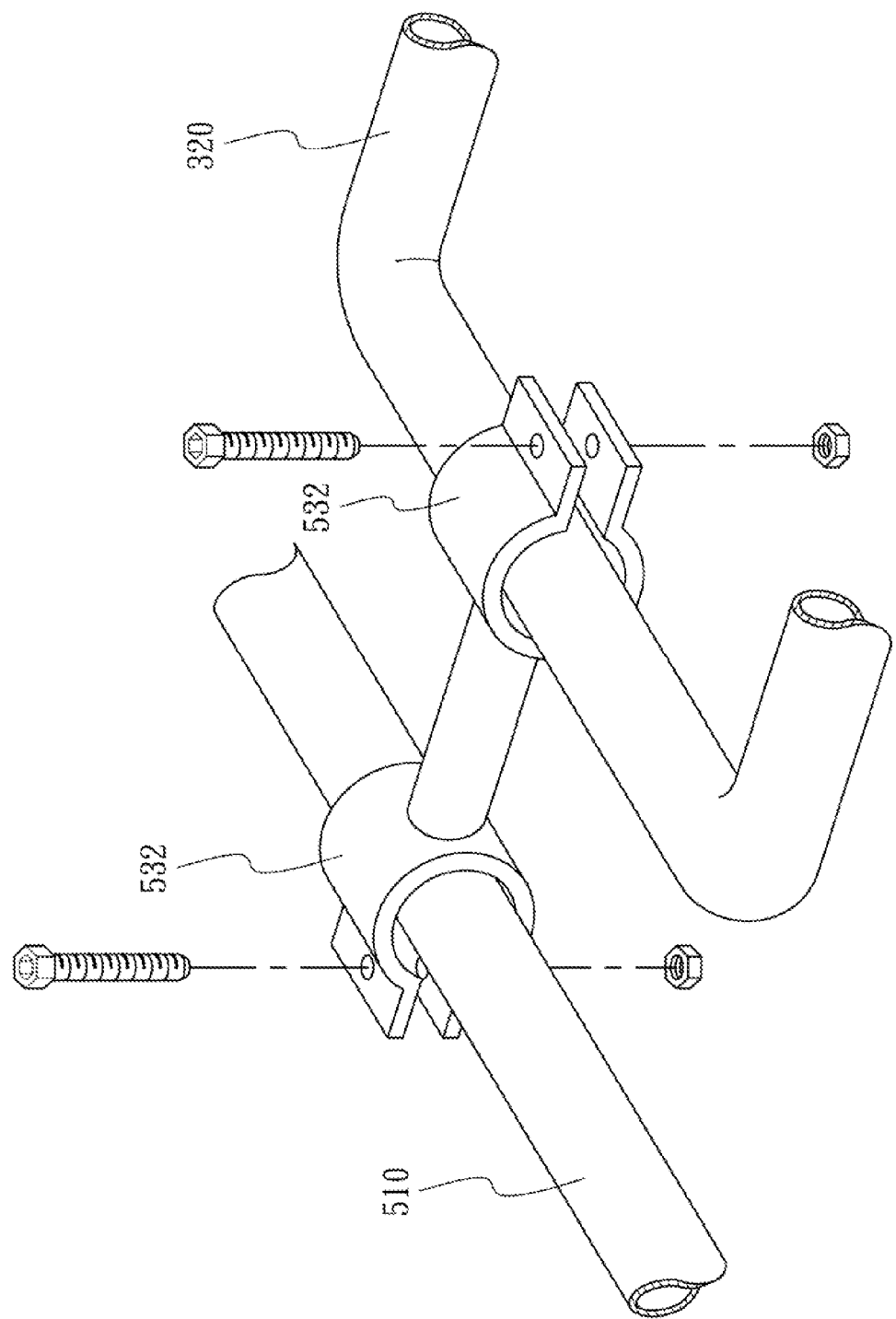
FIG. 8A-8C are schematic views of different type of clips.
Figure 8B:
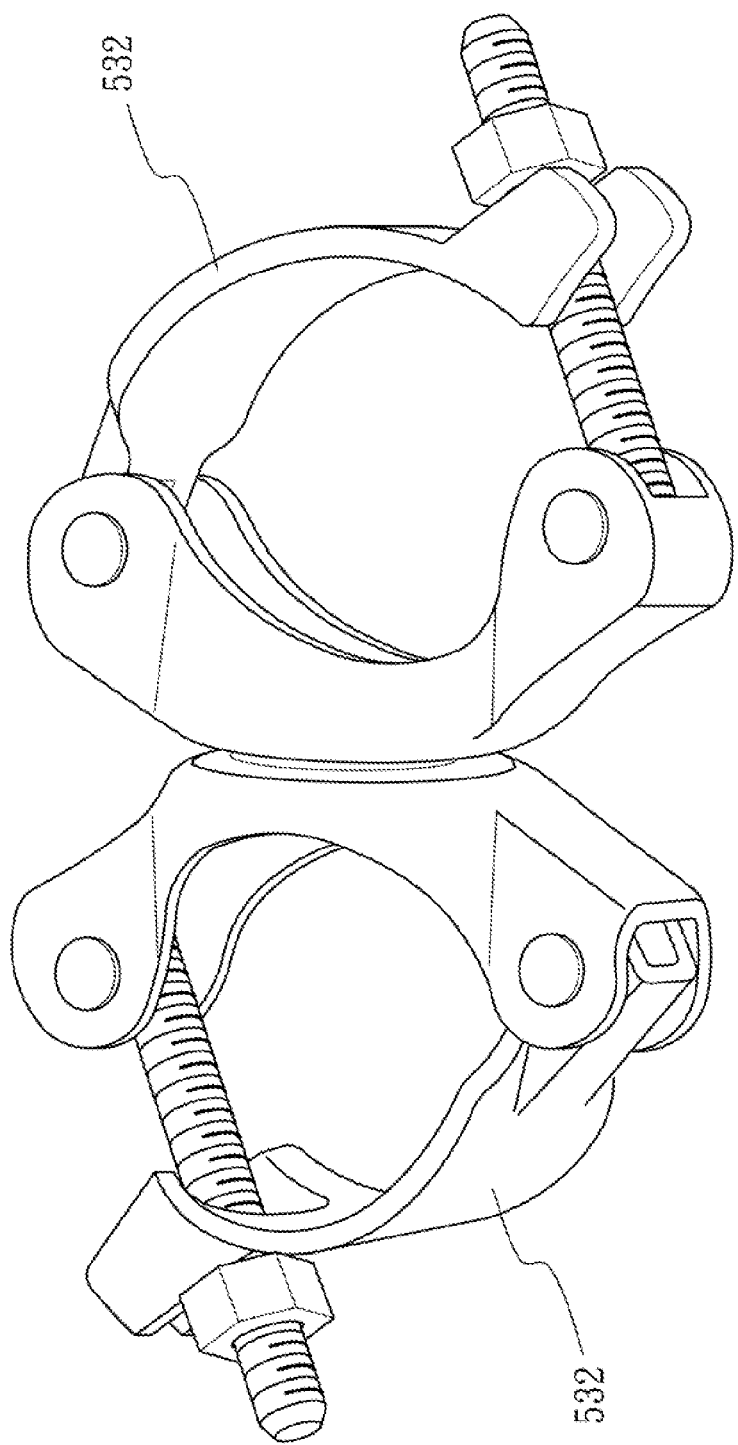
Figure 8C:
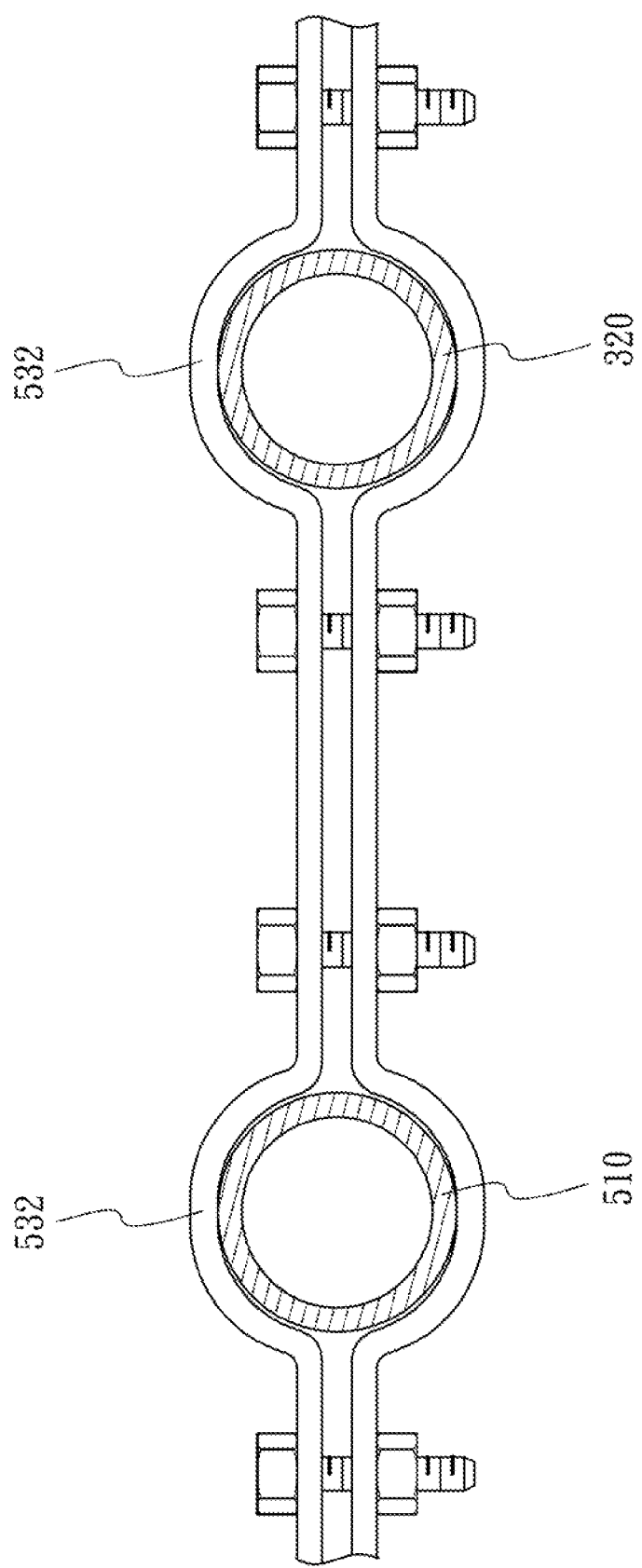

FIG. 8A-8C are schematic views of different type of clip 530 of FIG. 6. The clip 530 includes two locking rings 532. The two locking rings 532 are respectively connected to the pipe body 510 and the coolant line of the coolant system 320. The two locking rings 532 can replace the universal joint 531 of FIG. 7 for decreasing the thermal resistance.

Additionally, the pipe body 510 of the LED headlight thermal conducting device 500 can be a thermosyphon, a capillary driven heat pipe or a loop heat pipe. In detail, the thermosyphon can increase the ability of thermal conduction of the cooling device. When the condensation part of the device is on the upper side, and the evaporator part of the device is on the down side, the capillary driven heat pipe can drive the liquid from the condensation part to the evaporator part. The loop heat pipe can separate the airflow and the fluid of the cooling device then decrease the thermal.

What is claimed is:

1. An LED headlight cooling system comprising:
   a vehicle air conditioner having a cooling device;
   a thermal conducting device thermally connected to the cooling device of the vehicle air conditioner; and
   an LED headlight thermally connected to the thermal conducting device.

2. The LED headlight cooling system of claim 1, wherein the cooling device is a Peltier device.

3. The LED headlight cooling system of claim 1, wherein the cooling device is a coolant system.

4. The LED headlight cooling system of claim 3, wherein the coolant system has a coolant line, and the thermal conducting device is connected to the coolant line of the coolant system.

5. The LED headlight cooling system of claim 4, further comprising:
   a clip clipping the thermal conducting device to the coolant line of the coolant system.

6. The LED headlight cooling system of claim 4, wherein the coolant system has an evaporator connected to the coolant line, and the thermal conducting device is connected to the junction of the coolant line and the evaporator.

7. The LED headlight cooling system of claim 4, wherein the coolant system has a condenser connected to the coolant line, and the thermal conducting device is connected to the junction of the coolant line and the condenser.

8. The LED headlight cooling system of claim 4, wherein the coolant system has a vapor-liquid separator connected to the coolant line, and the thermal conducting device is connected to the junction of the coolant line and the vapor-liquid separator.

9. The LED headlight cooling system of claim 4, wherein the coolant system has a reservoir connected to the coolant line, and the thermal conducting device is connected to the junction of the coolant line and the reservoir.

10. The LED headlight cooling system of claim 4, wherein the thermal conducting device is a heat pipe.

11. The LED headlight cooling system of claim 4, wherein the thermal conducting device is welded to the coolant line.

12. The LED headlight cooling system of claim 4, wherein the thermal conducting device is soldered to the coolant line.

13. The LED headlight cooling system of claim 4, wherein the thermal conducting device is threaded to the coolant line.

14. An LED headlight thermal conducting device connecting an LED headlight of a vehicle and a cooling device of the vehicle, the LED headlight thermal conducting device comprising:
   a pipe body;
   a connecting member for connecting one end of the pipe body to the LED headlight of the vehicle; and
   a clip for connecting the other end of the pipe body to the cooling device of the vehicle.

15. The LED headlight thermal conducting device of claim 14, wherein the clip is a mechanical clip.

16. The LED headlight thermal conducting device of claim 15, wherein the mechanical clip is a circlip.

17. The LED headlight thermal conducting device of claim 14, wherein the pipe body is a thermosyphon.

18. The LED headlight thermal conducting device of claim 14, wherein the pipe body is a capillary driven heat pipe.

19. The LED headlight thermal conducting device of claim 14, wherein the pipe body is a loop heat pipe.

* * * * *